United States Patent
Stepanova (10) Patent No.: US 7,637,404 B1
(45) Date of Patent: Dec. 29, 2009

(54) FLORAL CONTAINER HOLDER FOR VEHICLE

(76) Inventor: Irina Stepanova, 26552 Via Cuervo, Missio Viejo, CA (US) 92691

( * ) Notice: Subject to any disclaimer, the term of this patent is extended or adjusted under 35 U.S.C. 154(b) by 331 days.

(21) Appl. No.: 10/878,502

(22) Filed: Jun. 28, 2004

(51) Int. Cl.
*B60R 7/00* (2006.01)
(52) U.S. Cl. ................................. 224/275
(58) Field of Classification Search ............. 224/275, 224/413, 42.39, 201, 525, 560
See application file for complete search history.

(56) References Cited

U.S. PATENT DOCUMENTS

| | | | | |
|---|---|---|---|---|
| 909,217 | A | * | 1/1909 | Presba .................... 224/201 |
| 1,474,728 | A | * | 11/1923 | Nelson .................... 224/201 |
| 2,289,701 | A | * | 7/1942 | Engel et al. ............. 248/311.2 |
| 2,933,358 | A | * | 4/1960 | Sheble et al. ............ 108/46 |
| 4,387,839 | A | * | 6/1983 | Dranchak ................ 224/265 |
| 4,819,803 | A | | 4/1989 | Neiser |
| 5,003,725 | A | | 4/1991 | Maddox |
| 5,060,798 | A | | 10/1991 | Braastad |
| 6,102,204 | A | | 8/2000 | Castleberry |
| 6,329,583 | B1 | * | 12/2001 | May ........................... 84/421 |
| 6,561,353 | B2 | | 5/2003 | Levieux et al. |
| 6,769,659 | B1 | * | 8/2004 | Martello .................. 248/311.2 |

FOREIGN PATENT DOCUMENTS

FR      2661459      *   4/1990

* cited by examiner

*Primary Examiner*—Nathan J Newhouse
*Assistant Examiner*—Lester L Vanterpool (57) ABSTRACT

The improved floral container holder for vehicle is intended to provide the secure delivery of floral container, for example, such as vase with the flower, in upright position. The improved flower container holder comprises a lower portion connected to a main portion, which is by an upper connector coupled with the upper portion including the first and second supporting hooks appropriately coupled with the main portion. Also, the improved floral container holder comprises at least one of a plurality of supporting straps, each of which is by an appropriate strap connector coupled with the main portion.

1 Claim, 6 Drawing Sheets

FLORAL CONTAINER HOLDER FOR VEHICLE

FIELD OF THE INVENTION

The present invention generally relates to the field of floral container holders, and particularly, to holders for transporting flower vases and the like in an upright position in the vehicle.

BACKGROUND OF THE INVENTION

The retail floral shops commonly engage in over the counter sales to consumer customers of bouquets of flowers mostly contained within glass or pottery vases. Commonly, such customers will further use the vehicle (automobile/car). Where the car transports a passenger in addition to a driver, the passenger may hold the vase with the flowers in an upright position. Where there is no passenger to perform such function in the car, the vase should be supported in an upright position by the driver while occupied with driving, that is difficult and inconvenient. There are also many of major problems encountered in providing for the flower shop shipment of cut and live flowers and plants and other articles in the vases, pots, baskets, and receptacles holding same must be securely held in an upright position during shipment from the flower shop to the customers and kept from tilting, tipping over or breaking. A floral arrangement may be sent to an individual for a variety of reasons (hereinafter the floral arrangement means a container/such as e.g. vase, pots, basket etc./with the flowers which are disposed within the container). Furthermore, multiple shipments of different sized and configured vases being made to different locations and transported in the same vehicle must be kept from engaging each other during transit to prevent damage to the plants, flowers and receptacles holding the articles. It is known, that since delivery personnel are generally part time or unskilled workers with little or no experience in handling delicate floral arrangement and may have minimal job dedication, there is a need to have convenient vase shipping holders, which can be easily used in the cars by the florist and/or delivery personnel to prevent tipping and breakage of the product. There is also a need to be able to stack product so that maximum space utilization can be obtained in the vehicle. The problem of securing vases containing flowers in an upright position while they are being transported has been recognized for a number of years.

For example, the U.S. Pat. No. 5,003,725 describes a holder for a stuffed toy animal for use with a floral arrangement. The holder includes a back frame, a base platform and two grasping arms. The back frame has a top member, a bottom member and two side members. The base platform is pivotally coupled to the bottom member of the back frame so that it can be folded against the back frame. The stuffed toy animal is placed on the base platform in an upright position relative thereto. One end of each grasping arm is pivotally coupled to one of the two side members of the back frame so that the two grasping arms may either be folded so that they are adjacent to the back frame or be swung out in order to operate together holding the stuffed toy animal in its upright position. The back frame has a pair of ribbon slits which are disposed on the side members thereof and a vase hook which is mechanically coupled to the top member thereof. A ribbon is threaded through the ribbon slits and around the outer surface of the vase in order to tie the holder to the vase for both delivery and display. The vase hook hooks the peripheral lip of the vase. The vase hook has a screw hole so that once the ribbon has been untied the holder may be mounted on a wall by using a screw through the screw hole so that the vase hook secures the holder to the wall in order to display the stuffed toy animal.

This holder is not intended for the use in the vehicle and can not be applied for the car delivery activity.

Another flower vase holder by U.S. Pat. No. 5,060,798 is a paperboard or cardboard holder. The paperboard/cardboard blank has quandrantally located tabs die cut therein and inwardly located score or weakened fold lines. Outwardly spaced from the fold lines, that is, near the free ends of the tabs, are pairs of holes. With the exception of the holes in one tab, each hole in the other tabs has a slit and an entrance notch so as to facilitate the entrance of a portion of a ribbon. Whereas the tabs have holes formed therein, the blank has an additional first and second hole spaced from the tabs and also from each other, each having a slit and entrance notch to facilitate the insertion of a portion of a ribbon into the first and second holes. The blank has a square configuration, two corners thereof being provided with pairs of holes, each hole of each pair in the corners having slits and notches so as to also facilitate the insertion of ribbon portions so that the remaining end lengths of the ribbons can be wrapped around to anchor the ribbons after the ribbons, there being two, have been pulled taut to cause the tabs to tightly engage the sides of the vase and thus hold the vase in a stabilized vertical position for transportation. The holder can be readily placed on the floor or seat of a vehicle.

Such holder does not provide stable horizontal position on the floor or seat and can unsecuredly horizontally (laterally) move at the time of vehicle sudden stop or speed acceleration.

The stabilizing carrier for floral container by U.S. Pat. No. 4,819,803 is formed from a unitary blank. The blank is substantially rectangular in shape and includes four spaced apart fold lines. The blank is formed in the same manner as the previously described holder from conventional corrugated cardboard with the corrugations thereof extending substantially parallel to the longitudinal edges of the blank. Other materials can be employed and include plastic sheet material and paperboard material other than corrugated cardboard. More subjectively, the stabilizing carrier for a floral container is basically characterized by a bottom, two end walls and a top. The top is formed by two overlapping top panels. The top panels are hinge connected at their outer ends to the upper ends of the end walls. The lower ends of the end walls are pivotally connected to the bottom. Each top panel includes a semi-oval recess extending inwardly from its free edge. A bud vase or other floral container is set down on the bottom of the carrier and then the end walls and top panels are swung together, to move the two recesses together and towards the container, from opposite sides of the container. The top panels are overlapped and slid together until portions of the closed inner ends of the recesses contact the opposite sides of the container. Then, the top panels are stapled or otherwise secured together. The recesses in the top panel are shaped to make engaging contact with opposing side regions of a plurality of different sized floral containers, by a mere adjustment of the amount of top panel overlap. A change in the amount of top panel overlap will always change the length dimension of the opening formed by the two recesses. Each end panel is formed to include a brace flap. Each brace flap includes a generally vertical hinge connection to its end panel. Each brace flap also includes a lower end positioned to make bracing contact between the end wall and the bottom of the carrier when the flap is bent about its hinge connection, to project inwardly of the carrier from its end wall, and the top panels are together to form the carrier top. The lower end portion of each flap is positioned to make a frictional contact with the bottom of the carrier when the flap is turned to extend inwardly of the carrier from its end wall. Each flap includes a recess in its lower edge, positioned to provide a finger laterally outwardly from said recess. The finger is positioned to contact the bottom of the carrier when the flap is turned to extend inwardly from its end wall. The finger makes a frictional contact with the bottom of the carrier, and is able to bend somewhat, if necessary.

This carrier can be used in the car, but the described carrier has the same deficiency as a previous holder, i.e. the carrier does not provide stable/fixed horizontal position on the floor or seat and can unsecurely horizontally (laterally) move at the time of vehicle sudden stop or speed acceleration.

The floral transporter according to U.S. Pat. No. 6,102,204 is a transport container for fragile, such as e.g. floral vase, articles having a substantially rigid base member with a bottom planar surface. A plurality of flexible foamed plastic members having the same overall shape as the base member stacked and secured together forming a container body which is secured to the base member. Each of the flexible foamed plastic members defines a plurality of throughgoing substantially circular cutouts with a tooth assembly for each cutout extending inward toward the center point of each substantially circular cutout. The foamed plastic member cutouts axially aligned with cutouts of an adjacent foamed plastic member to form a stepped bore which can hold various sized articles. The container has to be preferably 24 inches square and 10 inches high is constructed with a rigid non-absorbent polystyrene base member provided with a plurality of hand cutouts. Polystyrene is used because it can absorb shock through the flexible cell structure of the material while retaining rigidity allowing it to maintain shape when handled and lifted. The hand cutouts are slot shaped and cut through the plastic base member. The base member as noted is preferably constructed of polystyrene formed in a square 24 inches by 24 inches and 1 inch in thickness having a planar top surface, and a planar bottom surface, which is provided for seating on the bed of a truck or van in order to form a stable platform. The planar bottom surface has four hand cutouts of an oval shape about 3½ inches in length and ¾ inches in width which extend through the base member. A series of container section members preferably formed of an absorbent polyurethane foam with a size of 24 inches by 24 inches and ranging from 2 inches to 2½ inches in thickness are stacked upon each other and secured to each other to form a unified construction. The section members are flexible because of the cell structure of the polyurethane foam which allows the container to absorb shock when struck by other boxes or items in the van or truck. In addition the container segment members are constructed of an absorbent material which allows them to absorb spillage of water or to be pre loaded with water or a growing medium to keep plants in a fresh stable condition. Each container member defines a plurality of throughgoing substantially circular cutouts which together define a cylindrical stepped bore or cavity. Each of the cutouts has inwardly extending spaced fingers, teeth or ribs directed toward the center of the circular cutout. The circumference of each cutout is located at least one inch from the outside side wall of the container section member to provide shock protection to the article being carried.

This floral transporter also has the same deficiency as a previously described holder/carriers, characterized by unstable (non-fixed) horizontal position on the car's floor and can unsecurely horizontally (laterally) move at the time of the shock (vehicle sudden stop or speed acceleration).

Another apparatus described in the U.S. Pat. No. 6,561,353 provides securing a vase upon a car seat. The apparatus includes the vase holder, having a ceiling panel, including a forward end, a rearward end, a right end, a left end, and a vase receiving aperture, the vase holder further having a front wall panel hingedly attached to the forward end of ceiling panel, a rear wall panel hingedly attached to a rearward end of the ceiling panel, a floor panel hingedly attached to a lower end of the front wall panel, a car seat engaging panel hingedly attached to a rearward end of the rear wall panel, and a tab and slot attachment for connecting the rearward end of the floor panel to the lower end of the rear wall panel; downwardly pivoting the front and rear wall panels; rearwardly pivoting the floor panel; attaching the floor panel to the lower end of the rear panel; inserting the car seat engaging panel into a cleft within the car seat; and, inserting the vase into the vase receiving aperture. The vase holder consists of a single sheet of corrugated cardboard comprising the depicted plurality of panels conjoined by a plurality of living hinges. The living hinges are representationally depicted as closely spaced parallel lines. The living hinges attach triangular vase centering panels to ceiling panel so that said panels extend inwardly from the annular edge of vase receiving aperture. Trapezoidal front, right, rear, and left wall panels are hingedly attached to the front, right, rear, and left ends of ceiling panel by living hinges. Triangular fan joint panels span between the left, right, forward, and rearward ends of wall panels, said fan joint panels being interconnected, and being connected to the said wall panels by living hinges. A first floor panel is attached to front wall panel by living hinge, a second floor panel is attached to left wall panel by living hinge; and a third wall panel is attached to right wall panel by living hinge. A car seat engaging panel is attached to rear wall panel by living hinge. The car seat engaging panel comprises a pair of thickness adjustment panels, said panels being connected in series by living hinges. Second and third floor panels have slots, said slots being engageable with each other. The forward end of the first floor panel preferably comprises a tab panel, and tab lock panels, said tab and lock panels being interconnected and connected to floor panel by living hinges. Tab panel and tab lock panels are lockingly engageable with slot. The car seat engaging panel further comprises a tab panel connected by living hinge; said tab panel being removably engageable with slot. The folded end of car seat engaging panel may be extended rearwardly into a cleft which commonly exists between the bench and back rest of a car seat. Upon such insertion, the vase holder securely rests upon the upper seating surface of bench. After delivery, the assembly may be manually forwardly moved, pulling car seat engaging panel out of cleft.

Such vase holder secures the possible horizontal (lateral) movements at the time of shock, but has difficulties to provide straight upright vase's position considering almost always not exact horizontal car's seat upper surface.

Thus, there is a great need, therefore, for a convenient and not expensive floral container holder for vehicle, providing a secure delivery of the floral arrangements.

OBJECT AND ADVANTAGES OF THE INVENTION

Accordingly, several objects and advantages of the present invention are to provide the functions and advantages of the floral container holder for vehicle.

It is another object of the invention to provide the compatibility of the improved floral container holder for vehicle with the vases (flower containers) of any forms and reasonable dimensions.

It is still another object of the invention to decreases the cost of the floral container holder for vehicle.

It is also another object of the invention to provide compactness of the floral container holder for vehicle.

Still, further objects and advantages will become apparent from a consideration of the ensuing description accompanying drawings.

DESCRIPTION OF THE DRAWING

In order that the invention and the manner in which it is to be performed may be more clearly understood, embodiments thereof will be described by way of example with reference to the attached drawings, of which.

SUMMARY OF THE INVENTION

The improved floral container holder for vehicle is intended to provide the secure delivery of floral container, for example, such as vase with the flower, in upright position. The improved flower container holder comprises a lower portion connected to a main portion coupled by upper portion connection means with the upper portion including a horizontal member appropriately connected to the supporting hooks. Also, the improved floral container holder comprises at least one of a plurality of supporting straps, coupled by a strap connection means with the main portion.

DESCRIPTION OF THE PREFERRED EMBODIMENTS

Here the description of an improved floral container holder for vehicle will be done in statics (as if the components of the improved holder are suspended in the space) with description of their relative connections to each other. The description of the functional operations of an improved floral container holder will be done hereinafter.

Figure 1:
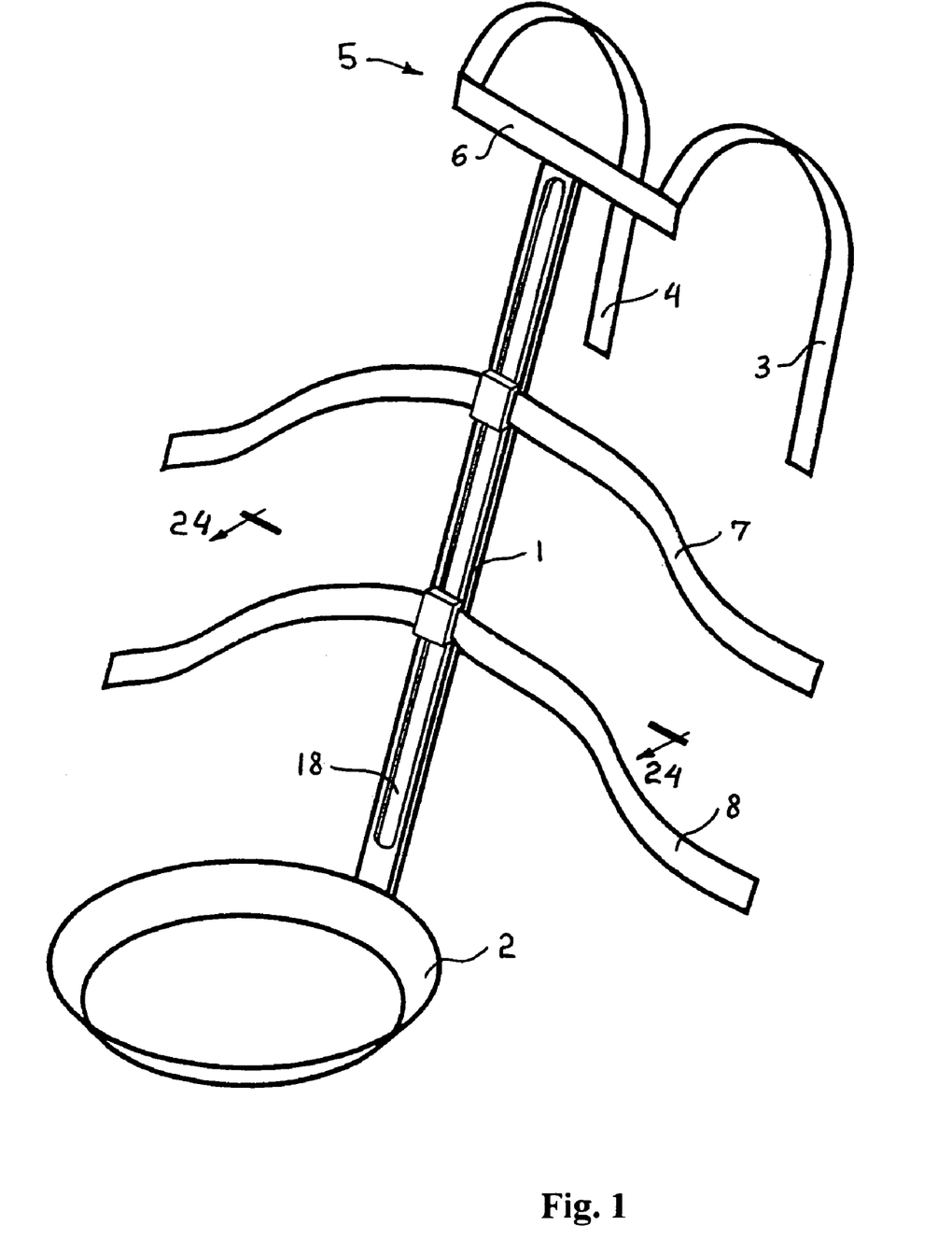
FIG. 1 is a simplified spatial view of the improved floral container holder.
Figure 2:
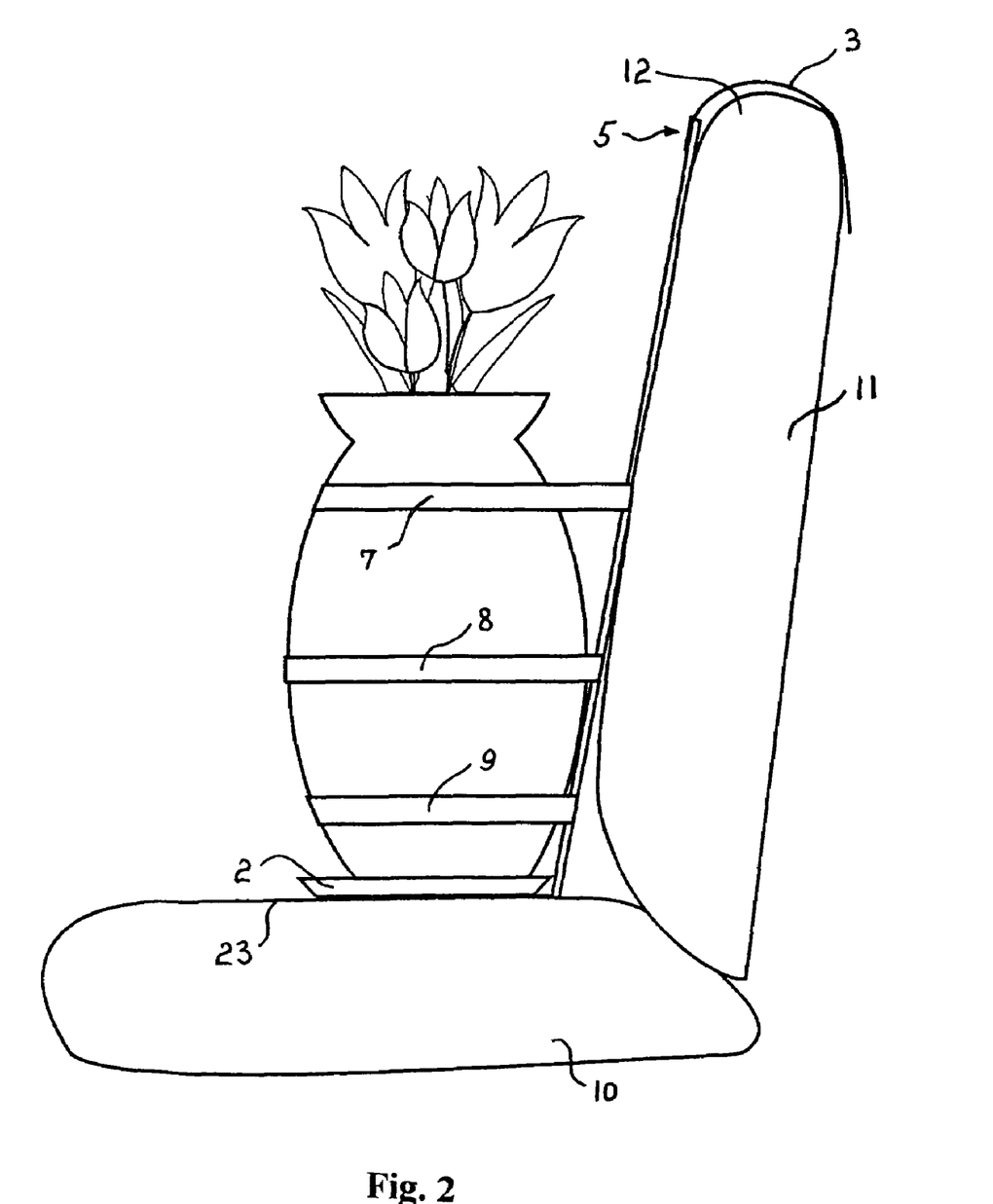
FIG. 2 is a simplified illustration of the installation of the improved floral container holder in the vehicle.
Figure 3A:
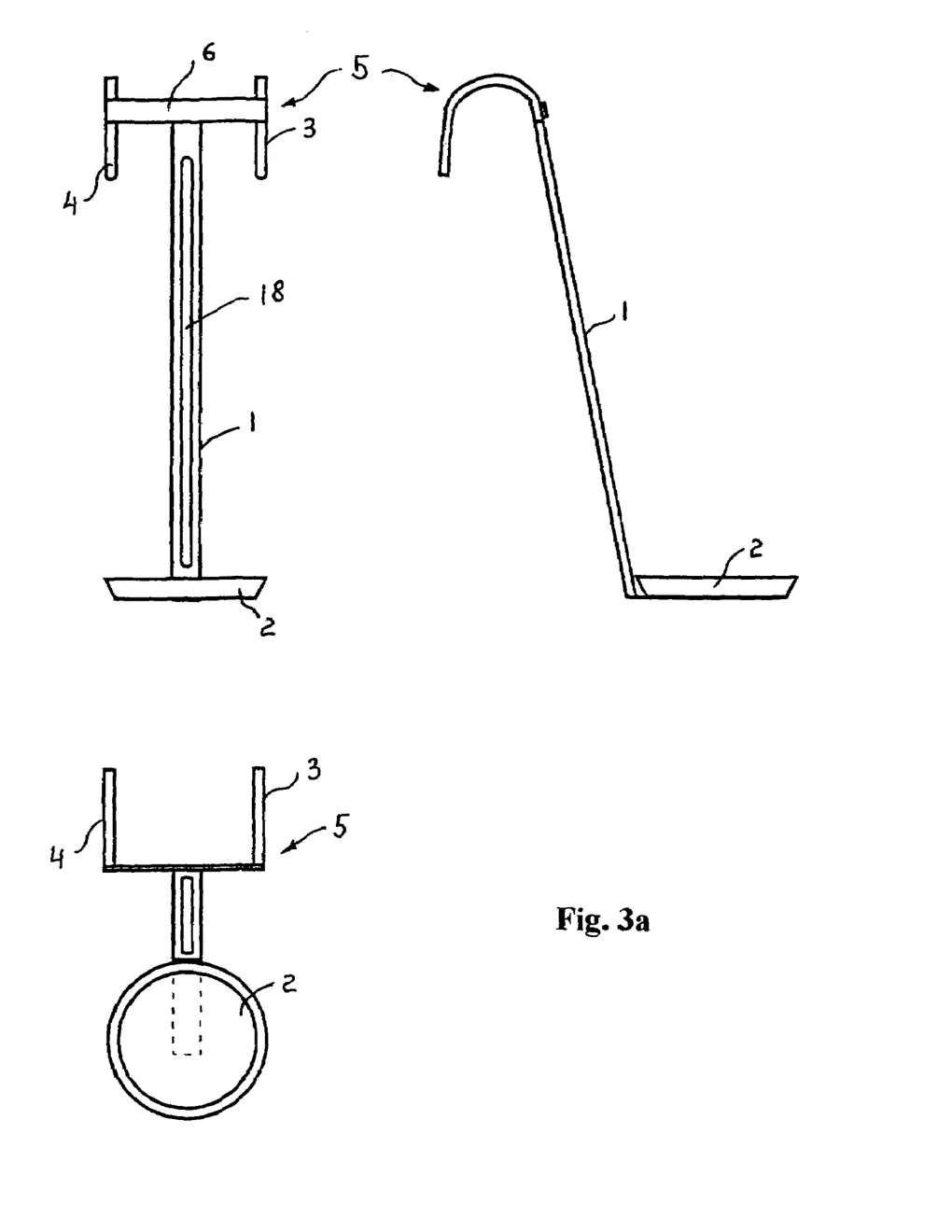
FIG. 3a is a simplified drawing of the front, top and side projections.
Figure 4:
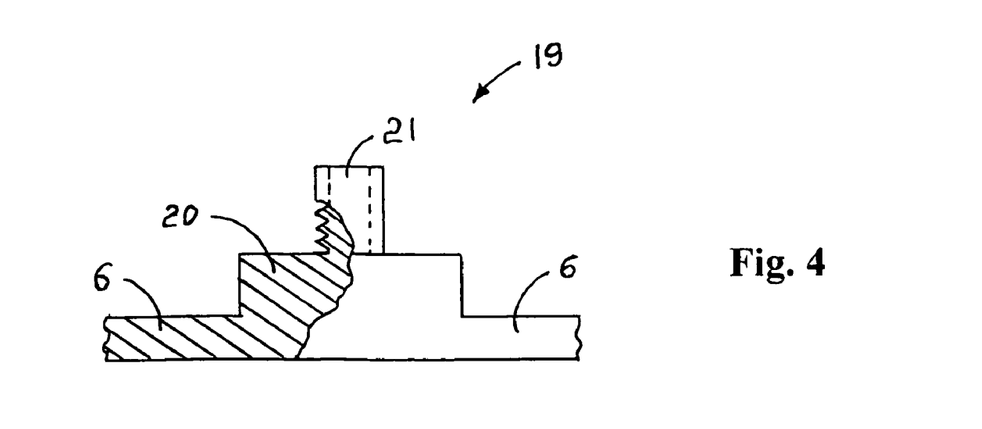
FIG. 4 is a simplified drawings of the upper portion connection means.
Figure 5A:
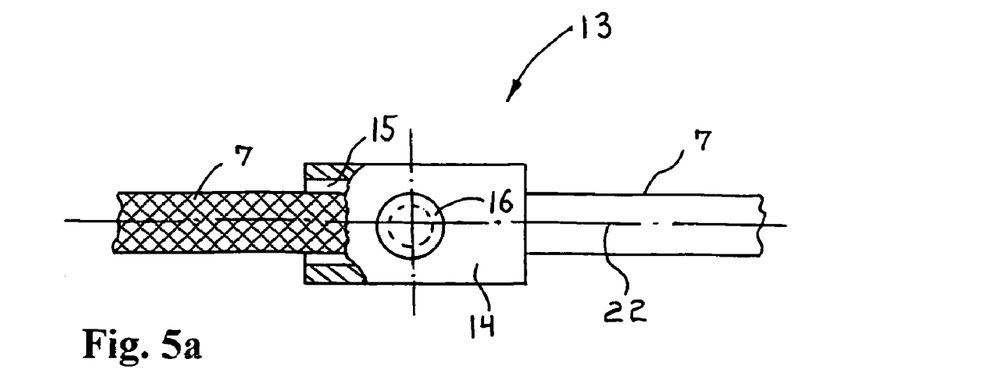
FIGS. 5a, 5b are the simplified front and top projections of the strap connection means.
Figure 5B:
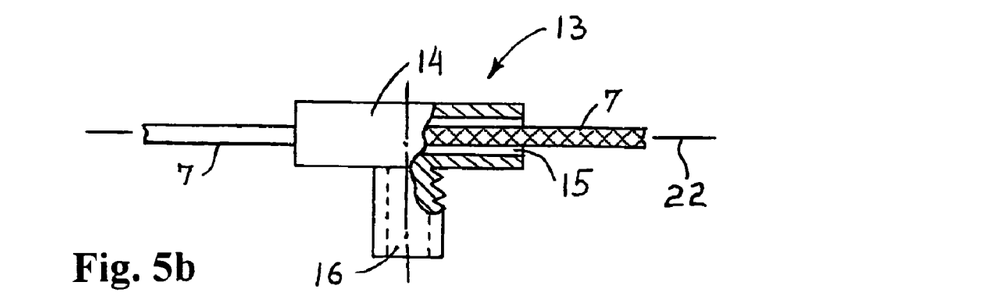

Referring to FIGS. 1, 3a, an improved floral container holder for vehicle comprises a main portion 1 which is connected to the lower (bottom) portion 2 and coupled with the upper (top) portion 5. The upper portion 5 includes a horizontal member 6 appropriately coupled at its right and left sides (first and second free ends respectively) with the first supporting hook 3 and second supporting hook 4 respectively. The bottom portion 2 can be rigidly connected to the main portion 1 (e.g. molded, welded, etc.), or can be connected, for instance, by screw(s), bolt(s) or lockingly engageable, etc. The upper portion 5 is by the connection means 19 (see FIG. 4) coupled with the main portion 1. The upper portion connection means 19 includes a first body 20 and the first threaded portion 21. The first body 20 can be rigidly (fixedly) connected to the horizontal member 6 (not shown) or can be extended from the horizontal member 6, as shown, for example, in FIG. 4. Referring to FIGS. 5a, 5b, the floral container holder also comprises at least one of a plurality of the supporting straps (in FIG. 1 it is conditionally shown two supporting straps: first supporting strap 7 and second supporting strap 8, and in FIG. 2 it is conditionally shown three supporting straps: first 7, second 8 and third 9 straps). Each supporting strap is coupled with the main portion 1 by an appropriate strap connection means. Each strap connection means 13 includes a second body 14, a second threaded portion 16, and an aperture 15 along the lateral axis 22. In FIGS. 5a, 5b the aperture 15 and, for example, the first supporting strap 7 are conditionally shown of a rectangular form, but the supporting straps and strap connection means can be of any compatible geometrical form, configuration and size. The aperture 15 provides the passage of the supporting strap (for instance, passage of the first supporting strap 7, as shown in FIGS. 5a, 5b). The supporting straps are intended to secure the upright vase position, as show in FIG. 2. Two free ends of each strap can be tightened to each other by the knot (not shown), can include strap-buckle (not shown) or can comprise a "Velcro" lock (not shown) on their free ends.

The main portion 1 includes the slot 18 to provide the height adjustment of the straps and horizontal member 6 positions on the main member 1. The slot 18 can for example be substitute for a plurality of holes (not shown) along the main portion 1.

Figure 6:
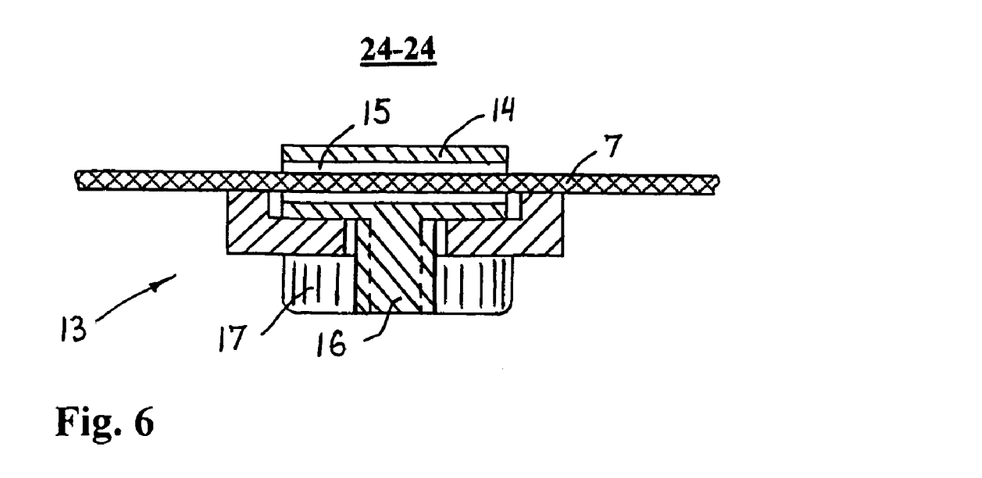
FIG. 6 is a simplified cross-sectional view 24-24 of the strap connection means housing.

The housing of the strap connection means 13 (with the inserted supporting strap) on the main portion 1 is shown in FIG. 6. Each supporting strap of a plurality of supporting straps (for example first supporting sharp 7) is inserted into the appropriate aperture (e.g. aperture 15) and extended through aperture 15 along axis 22 over the edges of the second body (e.g. second body 14) of the appropriate strap connection means (e.g. strap connection means 13, as for instance shown in FIG. 6). The second threaded portion 16 is installed in the slot 18, and tightened to the main portion 1 by the nut 17. The height of the supporting straps along the slot are adjusted to their best position on the main portion 1 in order to secure the upright position of the floral container.

The first supporting hook 3 and the second supporting hook 4 are overlap the upper side 12 of the car seat rest 11, and leaning upon car seat rest upper side 12. The upper portion connection means 19 is installed in same manner, i.e. the first threaded portion 21 of the first body 20 is inserted in the slot 18 and tightened to the main portion 1 by the analogous nut (not shown). The height of the position of the upper portion connection means 19 on the main portion 1 is determined in accordance to the height of the car seat back rest 11. When the supporting hooks 3 and 4 are leaned on the upper portion 12 of the car seat back rest 11, the upper portion connection means 19 is loosened, the main portion 1 is carefully pulled down until the bottom portion 2 will rest upon upper surface 23 of the car seat bench 10. Then the upper portion connection means 19 is tightened by the nut (not shown) to provide secure fixing of the assembled and adjusted position of main portion 1. The coupling of the horizontal member 6 with the supporting hooks 3 and 4 can be provided in the different manners. For example, the horizontal member 6 and hooks 3, 4 can be of the entire piece (molded), or the horizontal member can include the lateral slot(s) (not shown) or apertures (not shown) and each supporting hook 3, 4 can include the supporting hook connection means (not shown) analogous to the upper portion connection means 19 in order to provide adjustable coupling of the hooks 3, 4 with the horizontal member 6.

Figure 3B:
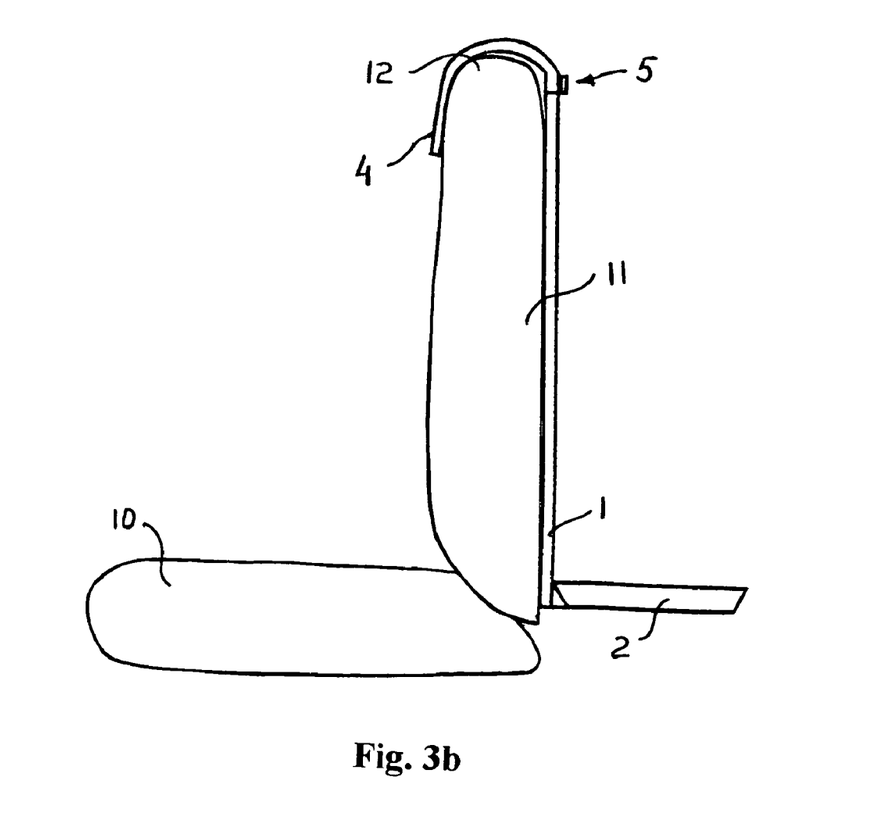
FIG. 3b is a simplified view of the side projection of the another configuration of the holder.
Figure 7A:
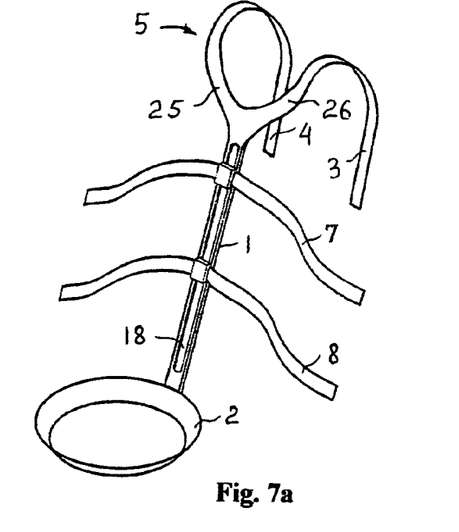
FIGS. 7a, 7b, 7c are the simplified drawing of V-shaped configuration.
Figure 7B:
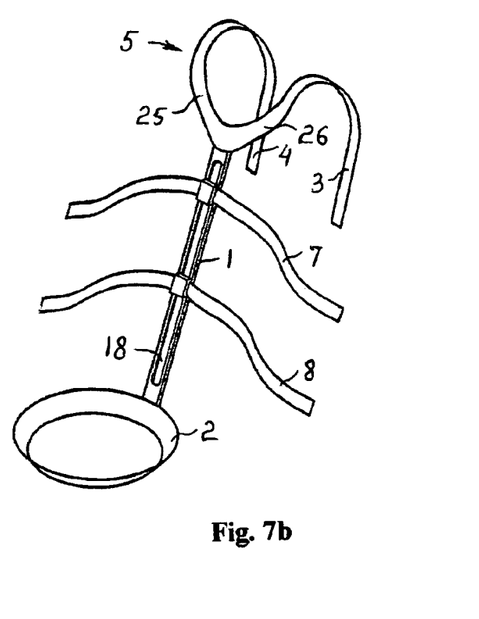
Figure 7C:
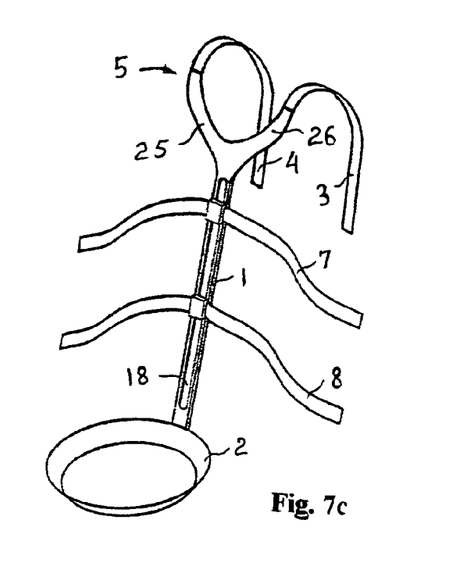

The cross-sectional profile of the main portion 1 can be of half-H-girder shape, as conditionally shown in FIG. 6 to provide the reliable strength of the main portion 1, but it can be of any form and/or configuration (for instance, of H-girder, plane or square form, etc.). Any and/or all parts of the floral container holder can be made of any material, for example, such as wood, plastic, metal, plywood, enough strong cardboard, etc., and can be of any form, geometrical configuration, and size. For example, the main portion 1 may be of the V-shaped configuration (not shown) or the upper portion 5 can have the V-shaped configuration (FIGS. 7a-7c), wherein the hooks 3 and 4 are extended from the V-lines as shown in FIGS. 7a, 7b (or coupled/connected with/to V-lines 25, 26 as shown in FIG. 7c), that eliminates/replaces (FIGS. 1, 3a and FIGS. 7a-7c) the horizontal member 6 of the upper portion 5. Also, the holder can have the another configuration and housing as it is shown in FIG. 3b.

CONCLUSION, RAMIFICATION AND SCOPE

Accordingly the reader will see that, according to the invention, I have provided the floral container holder intended for secure transporting in the vehicle. The improved floral container holder provides possibility of the secure delivery of the vase with flower in upright position using the regular (not specialized) transportation.

While the above description contains many specificities, these should not construed as limitations on the scope of the invention, but as exemplification of the presently-preferred embodiments thereof. Many other ramifications are possible within the teaching to the invention. For example, an improved floral container holder can prevent water spillage from the vase to inside car/cab (such as a car/cab floor, seat, etc. during delivery and has unification and universality providing the adjustment of the improved holder to any vehicle seat model.

Thus, the scope of the invention should be determined by the appended claims and their legal equivalents, and not by examples given.

15. an aperture;
16. a second threatened portion;
17. a nut;
18. a slot;
19. an upper portion connection means;
20. a first body;
21. a first threatened portion;
22. an axis;
23. an upper surface (of the vehicle seat bench 10);
24-24. a cross-sectional view;
25, 26. V-lines.

What is claimed is:

1. A floral container holder for vehicle comprising
a plate-shaped lower portion connected to a lower side of a main portion of said floral container holder hung on a seat back rest of said vehicle;
an upper portion coupled with said main portion, and wherein said upper portion includes
a horizontal member coupled with an upper side of said main portion, and wherein said horizontal member comprises a first free end and a second free end;
a first supporting hook coupled with said first free end of said horizontal member of said upper portion of said floral container holder for vehicle;
a second supporting hook coupled with said second free end of said horizontal member of said upper portion of said floral container holder for vehicle;
at least one of plurality of supporting straps, and wherein said at least one or each supporting strap is coupled with said main portion by a strap connection means including a body and a threaded portion extended of said body or rigidly connected to said body, and wherein said body includes an aperture providing a passage of the appropriate supporting strap, and wherein said threaded portion of said strap connection means is installed in a single elongated slot, and wherein said strap connection means is movably adjustable along the length of said single elongated slot providing an adjustability of a position of said at least one or said each supporting strap on said main portion, and wherein the length of said single elongated slot is substantially the length of said main portion, and wherein said threaded portion is tightened to said main portion by a nut.

* * * * *